US012682227B2

(12) United States Patent
Xia et al.

(10) Patent No.: US 12,682,227 B2
(45) Date of Patent: Jul. 14, 2026

(54) MEMRISTIVE CELLULAR NEURAL NETWORK

(71) Applicant: University of Massachusetts, Boston, MA (US)

(72) Inventors: Qiangfei Xia, Amherst, MA (US); Vigneshwar Ravichandran, N. Chelmsford, MA (US); Tina Maurer, Redwood City, CA (US)

(73) Assignee: University of Massachusetts, Westborough, MA (US)

( * ) Notice: Subject to any disclaimer, the term of this patent is extended or adjusted under 35 U.S.C. 154(b) by 561 days.

(21) Appl. No.: 18/358,139

(22) Filed: Jul. 25, 2023

(65) Prior Publication Data

US 2024/0046083 A1 Feb. 8, 2024

Related U.S. Application Data

(60) Provisional application No. 63/370,162, filed on Aug. 2, 2022.

(51) Int. Cl.
*G06N 3/06* (2006.01)
*G06N 3/065* (2023.01)

(52) U.S. Cl.
CPC .................................... *G06N 3/065* (2023.01)

(58) Field of Classification Search
CPC .................................................... G06N 3/065
See application file for complete search history.

(56) References Cited

U.S. PATENT DOCUMENTS

| | | | |
|---|---|---|---|
| 10,186,660 B2 | 1/2019 | Xia et al. | |
| 2004/0223391 A1* | 11/2004 | Erten ..................... | H04N 25/00 |
| | | | 365/202 |
| 2018/0276537 A1* | 9/2018 | Wood ..................... | G06N 3/049 |

(Continued)

OTHER PUBLICATIONS

Krestinskaya, "Neuromemristive Circuits for Edge Computing: A Review", IEEE Transactions on Neural Networks and Learning Systems, vol. 31, No. 1, Jan. 2020. (Year: 2020).*

(Continued)

*Primary Examiner* — Dave Misir
(74) *Attorney, Agent, or Firm* — Schwegman Lundberg & Woessner, P.A.

(57) ABSTRACT
A system includes a sensor, a plurality of cells, and a processor. The sensor includes a plurality of transducers arranged on a planar surface and includes a first transducer and a second transducer. The first transducer is configured to produce an analog output signal corresponding to a detected input signal. The cells are arranged in a network and include a first and a second cell and are disposed proximate the sensor in a three-dimensional stacking fashion. The first transducer and the second transducer are electrically coupled to the first cell and the second cell in one-to-one relation. The first cell includes a plurality of inputs and a first cell output. Each input is coupled to an output of a corresponding plurality of neighboring cells. The first cell includes a first memristor and a bridge circuit configured to receive the analog output signal and provide a current corresponding to the detected input signal in a pixel-parallel fashion. The processor is coupled to the network and generates a parameter associated with a weight for each cell of the plurality of cells.

12 Claims, 9 Drawing Sheets

(56) References Cited

U.S. PATENT DOCUMENTS

| | | | | |
|---|---|---|---|---|
| 2018/0364785 A1* | 12/2018 | Hu | .................. | G06F 1/3206 |
| 2018/0365520 A1* | 12/2018 | Lee | .................. | G06N 3/065 |
| 2020/0053299 A1* | 2/2020 | Zhang | .................. | H04N 23/80 |

OTHER PUBLICATIONS

Hu, "A Memristive Multilayer Cellular Neural Network With Applications to Image Processing", IEEE Transactions on Neural Networks and Learning Systems, vol. 28, No. 8, Aug. 2017. (Year: 2017).*

Duan, "Memristor-Based Cellular Nonlinear/Neural Network: Design, Analysis, and Applications", IEEE Transactions on Neural Networks and Learning Systems, vol. 26, No. 6, Jun. 2015. (Year: 2015).*

Anderson, Howard C., "Neural network machines", IEEE Potentials, vol. 8, No. 1, pp. 13-16, 1989., Feb. 1989, 4 pgs.

Lecun, Y., "Backpropagation Applied to Handwritten Zip Code Recognition", Neural Computation, vol. 1, No. 4, pp. 541-551, 1989, Sep. 12, 1989, 11 pgs.

Mcculloch, Warren, "A logical calculus of the ideas immanent in nervous activity", The Bulletin of Mathematical Biophysics, vol. 5, No. 4, pp. 115-133, 1943, 1943, 21 pgs.

Rosebblatt, Frank, "The perception A probabilistic model for information storage and organization in the brain", Psychological Review, vol. 65, No. 6, pp. 386-408, 1958, 1958, 6 pgs.

* cited by examiner

MEMRISTIVE CELLULAR NEURAL NETWORK

CLAIM OF PRIORITY

This patent application claims the benefit of priority of U.S. Provisional Patent Application Ser. No. 63/370,162, filed on Aug. 2, 2022, which is hereby incorporated by reference herein in its entirety.

BACKGROUND

A neural network can be used in a wide variety of information processing tasks such as pattern recognition or system control. A neural network can provide good results even with noisy or incomplete data.

A typical neural network includes an input and an output between which is an array of interconnected nodes. The interconnected nodes are associated with a weight that expresses relationships between the connected nodes. The weights are determined while operating the network in a training mode and following training, the input data is processed in accordance with the model reflected by those weights.

In one example, a neural network includes a large number of digital logic gates implemented in CMOS (complementary metal oxide semiconductor). Recognized shortcomings of such CMOS-based neural networks includes high power requirements, physically large size, and slow processing speeds.

Neural networks are mentioned in the following documents:

W. McCulloch and W. Pitts, "A logical calculus of the ideas immanent in nervous activity", *The Bulletin of Mathematical Biophysics,* vol. 5, no. 4, pp. 115-133, 1943. Available: 10.1007/bf02478259.

H. Anderson, "Neural network machines", *IEEE Potentials,* vol. 8, no. 1, pp. 13-16, 1989. Available: 10.1109/45.31575.

F. Rosenblatt, "The perceptron: A probabilistic model for information storage and organization in the brain.", *Psychological Review,* vol. 65, no. 6, pp. 386-408, 1958. Available: 10.1037/h0042519.

Y. LeCun et al., "Backpropagation Applied to Handwritten Zip Code Recognition", *Neural Computation,* vol. 1, no. 4, pp. 541-551, 1989. Available: 10.1162/neco.1989.1.4.541.

SUMMARY

A cellular neural network (CeNN) is a network in which repeating individual processing units (each of which is referred to as a cell), are connected to their own output and connected to the output of their nearest neighbors, transmitting analog voltage signals to one another to perform data processing. The nearest neighbors can be located at a radius of 1 or other value. Each cell has an input, an output, a state, and directly interacts with neighboring cells.

The inter-cell connections are referred to as synapses. In one example, the massively parallel nature of the analog network allows for high-speed processing with task completion times independent of network size. Since cells are repeating, identical units and are only locally connected to adjacent neighbors, the entire network can be implemented in a very-large-scale integration (VLSI) process, thus allowing for easy fabrication of larger networks.

In one example, a memristive cellular neural network has synaptic weights which are represented by the conductance of memristive devices. These synapses can be implemented with more than one design.

A memristive device is a two-terminal electrical component that sets forth a non-linear relationship between an applied voltage and the corresponding current. For example, U.S. Pat. No. 10,186,660 includes a discussion of a memristor and uses the phrase resistance switching device.

A memristive bridge synapse is non-volatile, has multiple and stable conductance levels, and has much better linearity relative to a CMOS-based circuit. In addition, a comparable memristor circuit can be implemented using a reduced number of transistors, thus fabricated on a smaller chip area, and reducing power consumption.

The hardware can be used for high-speed, low-latency and high-throughput image and video processing, for both spatial and temporal information.

Various hardware configurations are contemplated. For example, one configuration can be fabricated on a printed circuit board (PCB) with a number of cells arranged in a matrix. One example can be coupled to hardware and controlling software using commercial off-the-shelf CMOS image sensors and dynamic vision sensors (DVS) for video processing. One example can be configured as an integrated version of a cellular network on a single chip and can be fabricated with millions of cells, and achieve 1-to-1 connectivity with pixels on an image sensor (operating using either frame-based or event-based processing). In one example, the sensors and the cellular neural networks are fabricated by three-dimensional stacking of each layer.

Each of these non-limiting examples can stand on its own or can be combined in various permutations or combinations with one or more of the other examples.

This summary is intended to provide an overview of subject matter of the present patent application. It is not intended to provide an exclusive or exhaustive explanation of the invention. The detailed description is included to provide further information about the present subject matter.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
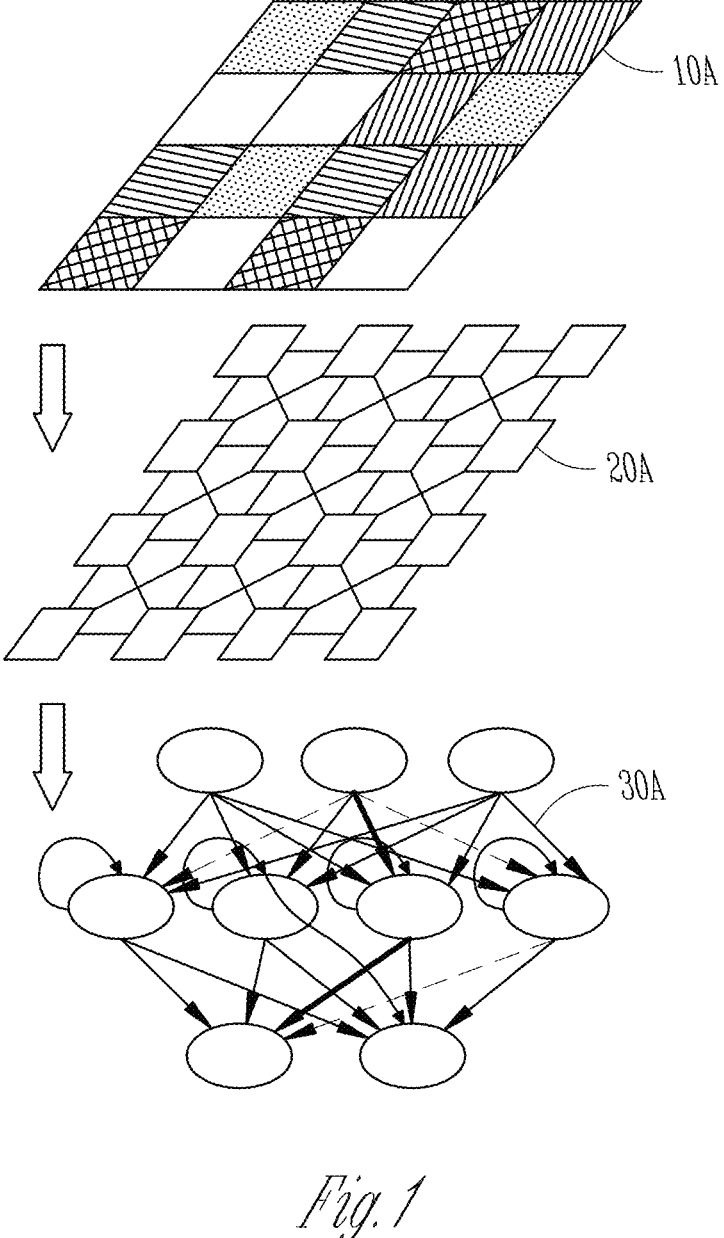
FIG. 1 illustrates a schematic of a three-layer architecture for a system, according to one example.

FIG. 1 illustrates a schematic of a three-layer architecture for a system. The three layers include a first layer (sensor 10A), a second layer (network 20A), and a third layer (network 30A).

In the example shown, sensor 10A includes a plurality of transducers. In one example, sensor 10A includes an image sensor having a plurality of pixels, and as shown, the sensor includes 16 transducers arranged in a matrix of 16 pixels on a planar substrate. Note that the number of transducers is not limited to 16 and can include tens of millions transducers. The term transducer refers to a device that converts one form of energy to another, such as an optical sensor which generates an electrical output signal based on a sensed optical signal at a sense surface. A transducer can be seen as type of sensor, which provides, by way of examples, an output based on a sensed parameter such as pressure, temperature, vibration, force, acceleration, mass, optical intensity, chemical content, dimension, or other measurable parameter. A transducer, by way of examples, can provide an analog electrical signal or a digital electrical signal at an output node.

In one example, each transducer processes an individual pixel and provides an output signal corresponding to an optical signal received on a sense surface. The sensor can provide real-time (or near real-time) signal acquisition and transmission or can provide an output corresponding to an image in memory or other storage device.

In the example shown, network 20A includes a cellular neural network (CeNN). Network 20A can provide ultrafast parallel edge processing with each cell receiving an input from a pixel aligned with a transducer of sensor 10A. In this manner, edge processing is provided by a cell which processes the output associated with one pixel.

In the example shown, network 30A includes a recurrent neural network (RNN) or other network. At this layer, recognition and tracking is performed based on the pre-processed data provided by the CeNN.

The configuration of the system in FIG. 1 provides, for example, a massively parallel image or video processing capability with ultra-high throughput. In some examples, the throughput may exceed a rate of 100k frames/second. In one example, the edge processor identifies changes and only sends important data to the next layer, omitting propagating unchanged (or redundant) data. This arrangement leads to high speed and improved power efficiency.

The configuration shown in FIG. 1 provides a fully-integrated three-dimensional, compact, light-weight, low latency and low power information processor. Security features can be embedded in the data processing.

One example can be configured to provide ultra-fast object tracking and trajectory prediction. One example can be configured to provide DNA sequencing. Other examples are also contemplated.

Figure 2:
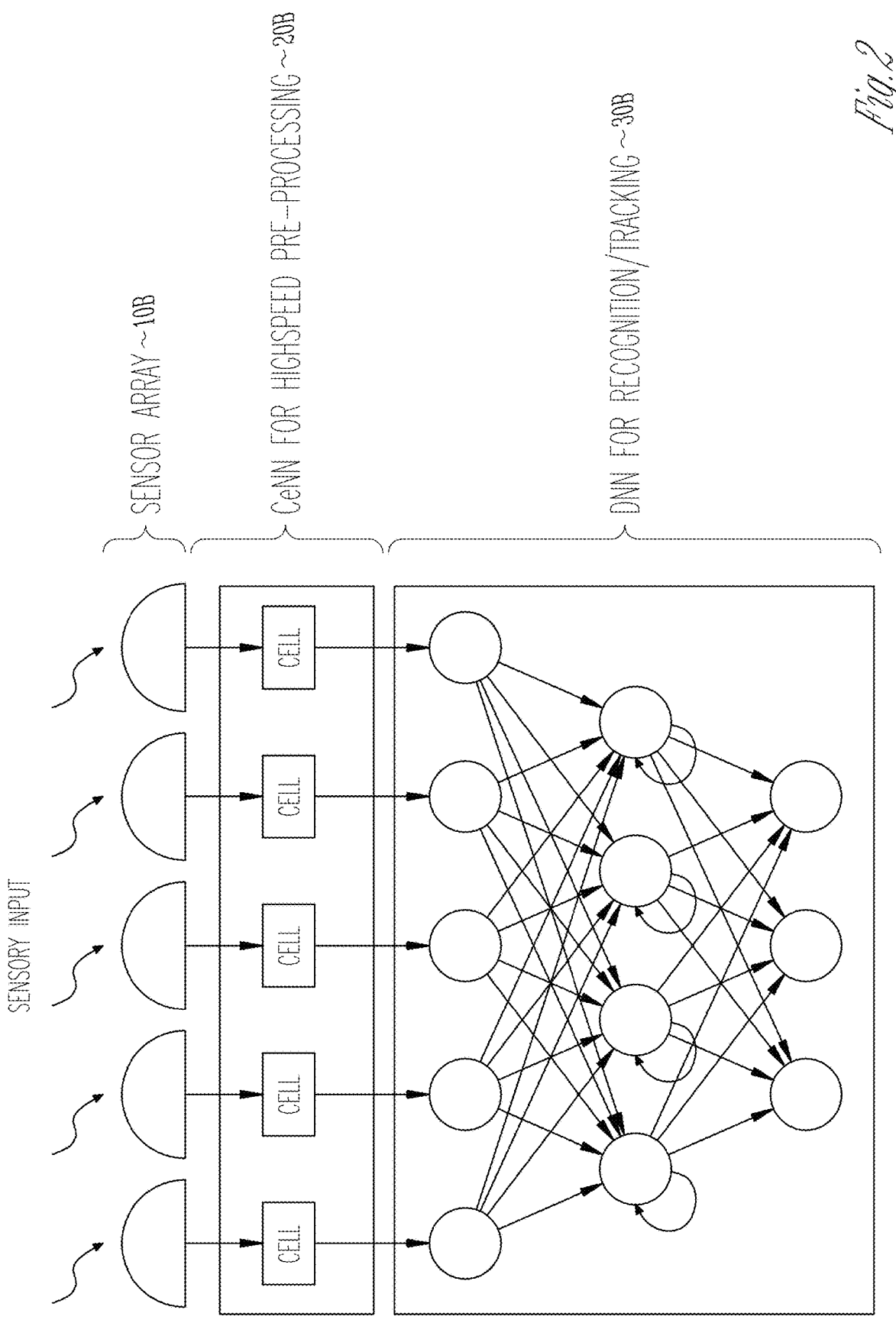
FIG. 2 illustrates an example of an integrated system in a cross-sectional view, according to one example.

FIG. 2 illustrates another example of an integrated system in a cross-sectional view. The first layer include sensor array 10B, the second layer includes CeNN layer 20B for high speed pre-processing, and third layer includes deep neural network (DNN) 30B configured for recognition and tracking functions.

In the example shown, sensor array 10B illustrates five transducers each of which are individually coupled to a cell in a one-to-one manner, and these are, in turn, coupled to the DNN layer 30B. A deep neural network is one example and other configurations having neurons, synapses, weights, biases, and functions are also possible. Notably, a sensor array of five transducers is rather small and the number of transducers, as noted elsewhere in this document, can be substantially larger, such as a number on the order of millions.

The topology of a CeNN includes a plurality of cells, each identical, and arranged in a repeating pattern. Each cell is connected to its nearest neighbor in a manner that emulates brain connectivity. This arrangement allows for analog in-memory processing at a high energy efficiency. Each cell processes one pixel of image data in parallel with all other cells, thus delivering high throughput. The low power, high speed analog processing configuration disclosed here can streamline object tracking, classification, DNA sequencing, and more.

Figure 3:
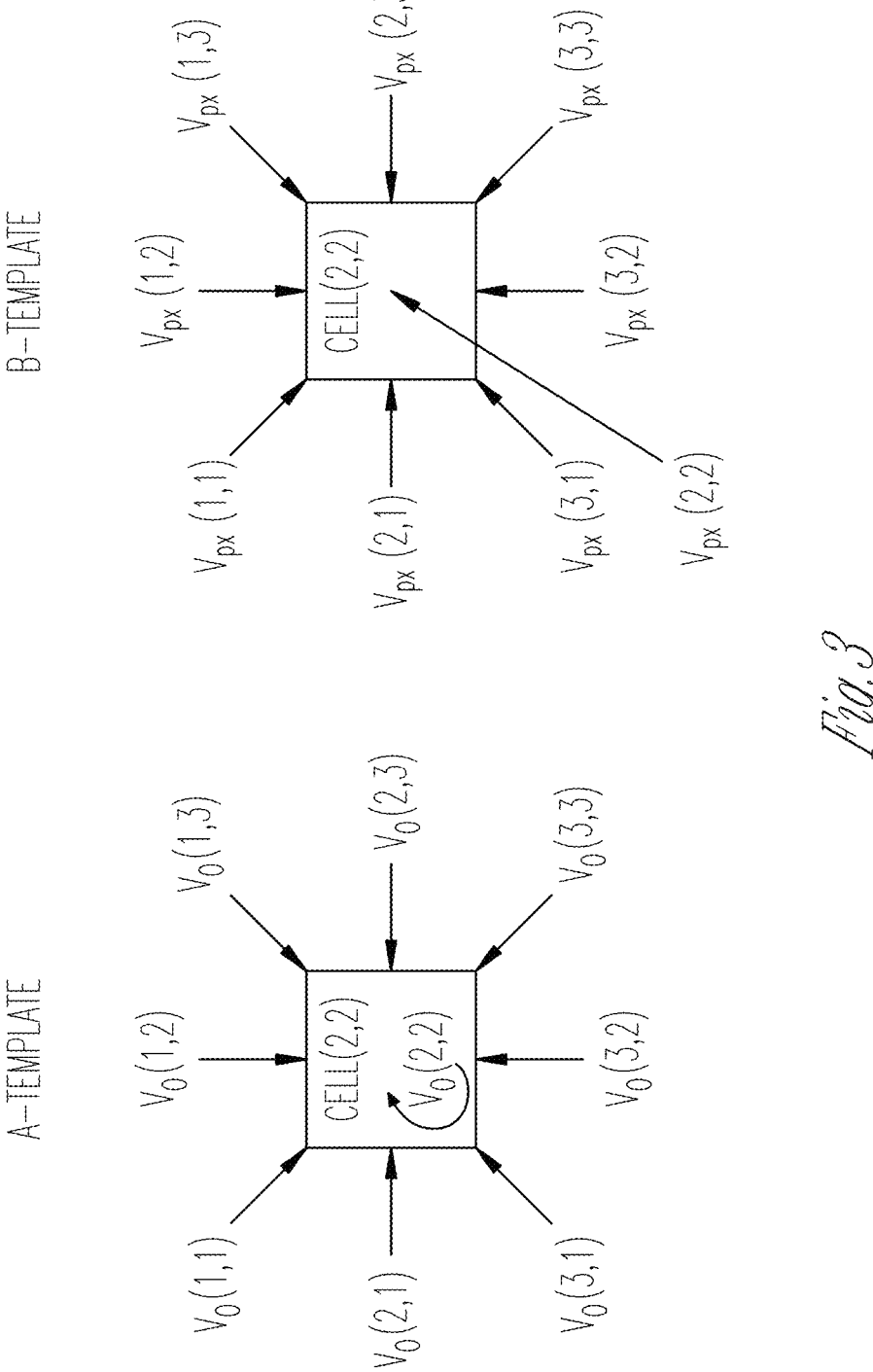
FIG. 3 illustrates template-based weighting, according to one example.

In one example, each cell has 18 weighted synapses as inputs and one biasing synapse. The 18 synapses form weight 'templates' associated with a particular application. As shown in FIG. 3, the A-template weights neighboring cells' outputs $V_o$ and the B-template weighs neighboring cells' pixel inputs $V_{px}$. In the figure shown, the parenthetical pairs represent row and column positions in an ordered matrix. Linear (both positive and negative) input-output relationships are required for predictable output and improved convergence.

The templates, here referred to as A-template and B-template, can be a matrix (having dimensions such as 3×3) selected to achieve a particular application. For example, a denoising implementation can use a matrix such as that shown in the following table of examples:

| A-template | B-template |
|---|---|
| [0 0 0] | [−0.25 −0.25 −0.25] |
| [0 0.5 0] | [−0.25 2.0 −0.25] |
| [0 0 0] | [−0.25 −0.25 −0.25] |
| [0 0 0] | [−0.25 −0.25 −0.25] |
| [0 0 0] | [−0.25 8.0 −0.25] |
| [0 0 0] | [−0.25 −0.25 −0.25] |
| [−0.5 1.0 −0.5] | [−0.5 1.0 −0.5] |
| [1.0 1.0 1.0] | [1.0 2.0 1.0] |
| [−0.5 1.0 −0.5] | [−0.5 1.0 −0.5] |
| [−0.25 1.0 −0.25] | [−0.25 1.0 −0.25] |
| [1.0 1.0 1.0] | [1.0 1.0 1.0] |
| [−0.25 1.0 −0.25] | [−0.25 1.0 −0.25] |

Figure 4:
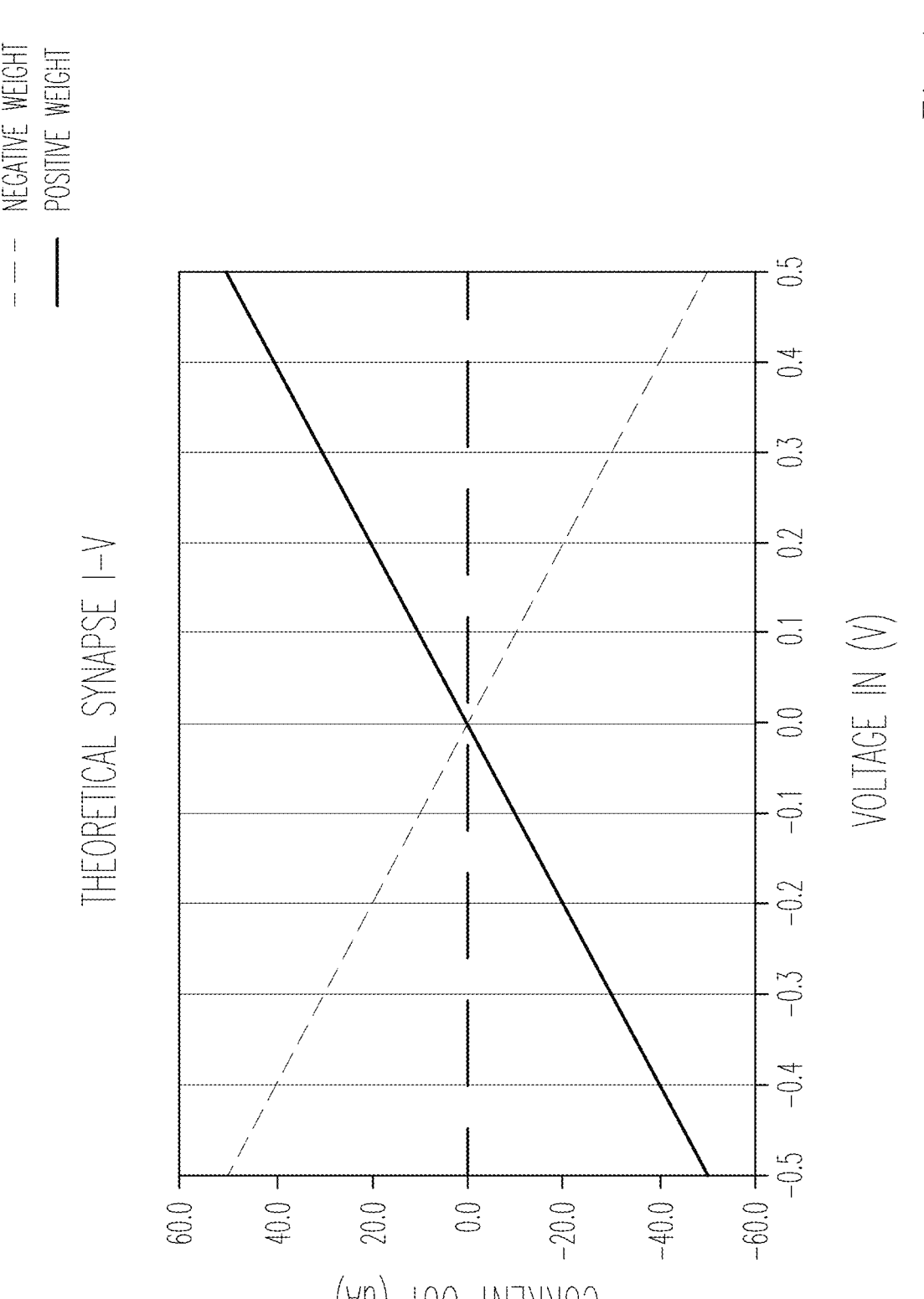
FIG. 4 illustrates synapse linearity, according to one example.

An example of linearity is depicted in FIG. 4.

Figure 5:
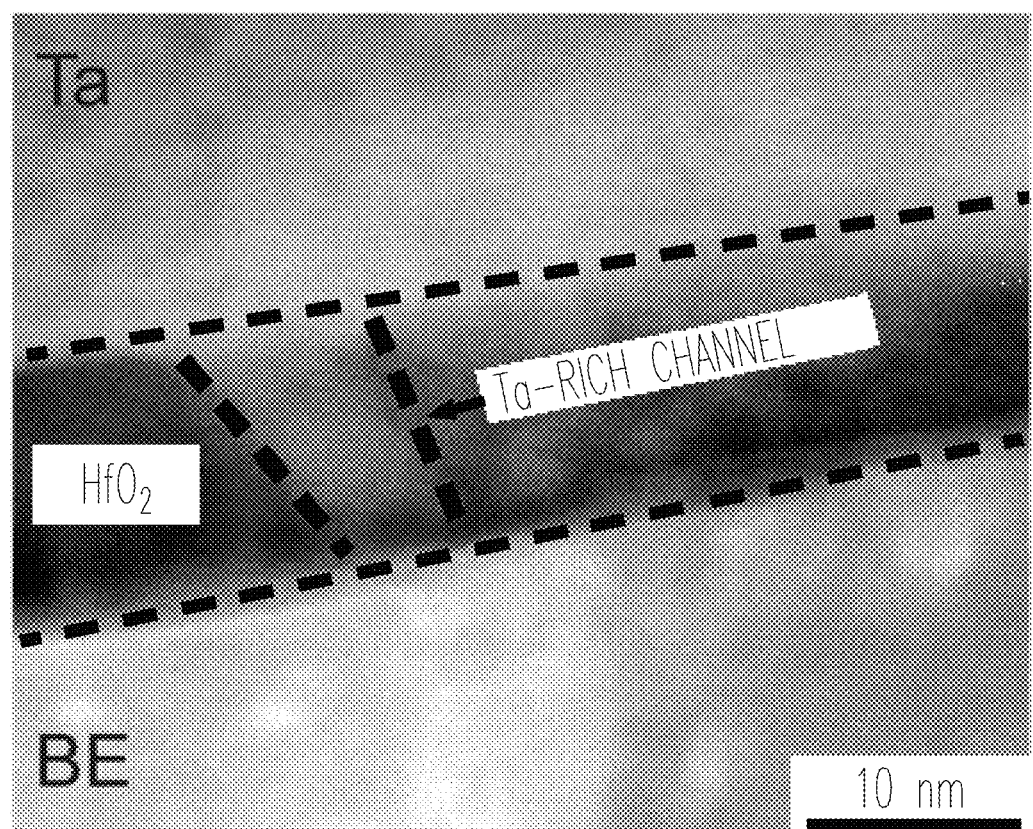
FIG. 5 illustrates an example of a memristor, according to one example.

In one example, the network includes a plurality of memristive synapses configured for low voltage, high speed, high endurance, and retention. One example of a memristor is depicted in FIG. 5. The memristor shown in the figure includes a tantalum-rich channel, a region of hafnium oxide, a tantalum top electrode, and a bottom electrode (marked here as BE, such as platinum). Other memristor types and configurations are also contemplated.

The memristor depicted here is configured for in-memory computing in an artificial neural network. An array of memristors can be configured as a deep learning accelerator and this structure can be used to build a bridge synapse for a CeNN as disclosed herein.

Figure 6:
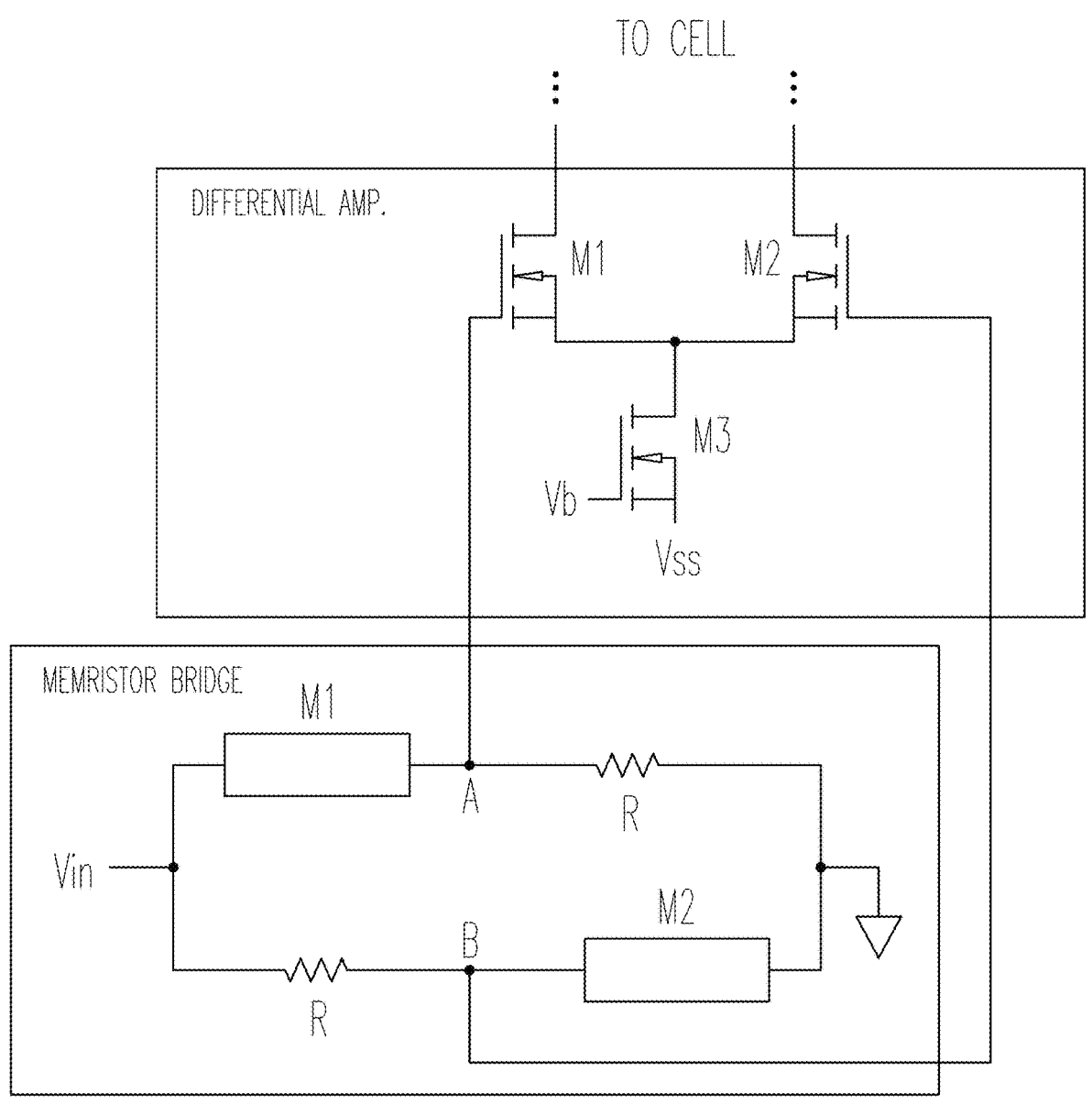
FIG. 6 illustrates an example of a bridge synapse, according to one example.

A bridge synapse can be fabricated as shown in FIG. 6. In the figure, the differential amplifier receives differential input signals, derived from M1 and M2, at bridged transistors as shown. The differential input signals are determined by the memristor bridge. The memristor bridge includes a parallel combination of a first voltage divider and a second voltage divider. The first voltage divider has a series connection of memristor M1 and first resistor R configured to provide voltage A to the first differential input. The second voltage divider has a series connection of second resistor R and memristor M2 configured to provide voltage B to the second differential input.

By adjusting the state of the memristors M1 and M2, the synaptic weights can be modulated. The voltage difference between voltage A and voltage B is converted into current via the differential amplifier which flows into the cell following the linear multiplication. Restated, the electric current provided to the cell is determined by the product of the differential amplifier gain and the voltage difference at voltage A and voltage B, which can be expressed as $I_{syn}=G_{DiffAmp}*(V_A-V_B)$, where I is current and G is gain.

Figure 7:
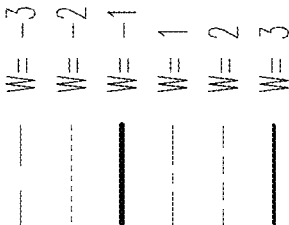
FIG. 7 illustrates synapse linearity, according to one example.
Figure 7:
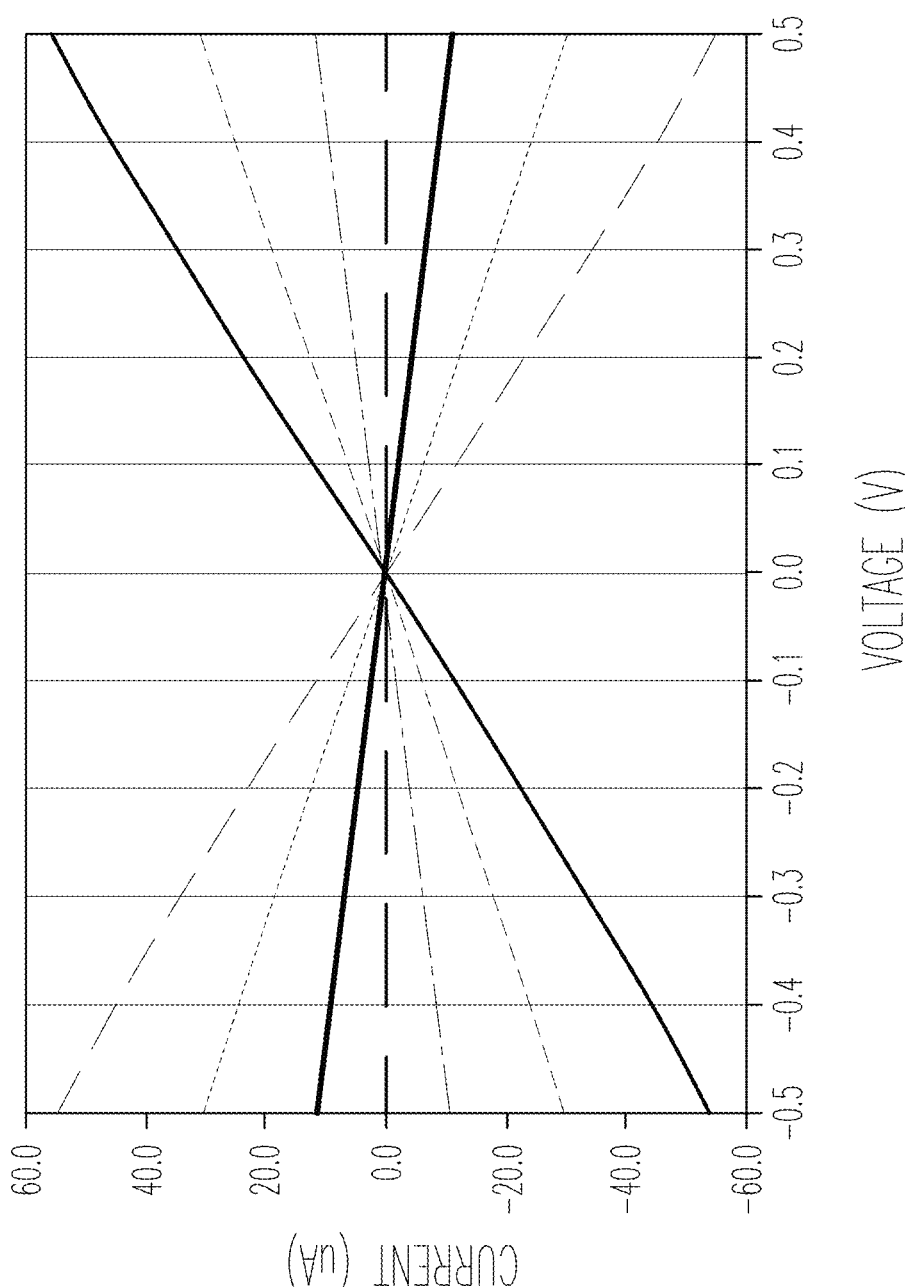
Figure 7:

An experimental version of the bridge synapse as represented in FIG. 6, provides a linear IV relationship with both positive slopes and negative slopes when operated at different weights, as shown in FIG. 7. In the figure, weights of –3 to +3 are depicted.

A CeNN utilizing the memristive synapses of the present subject matter provides multiple advantages. For example, in comparison to a CMOS-based CeNN, the memristive-based CeNN can be implemented with a smaller number of transistors per unit. This means that the memristive-based CeNN has a smaller circuit footprint. In addition, the memristive-based CeNN exhibits better multiplier linearity. In a CMOS-based CeNN, clipping can be seen at the lowest and highest voltages (and corresponding lowest and highest output currents). In addition, the memristive-based CeNN provides intrinsic radiation hardness.

Figure 8:
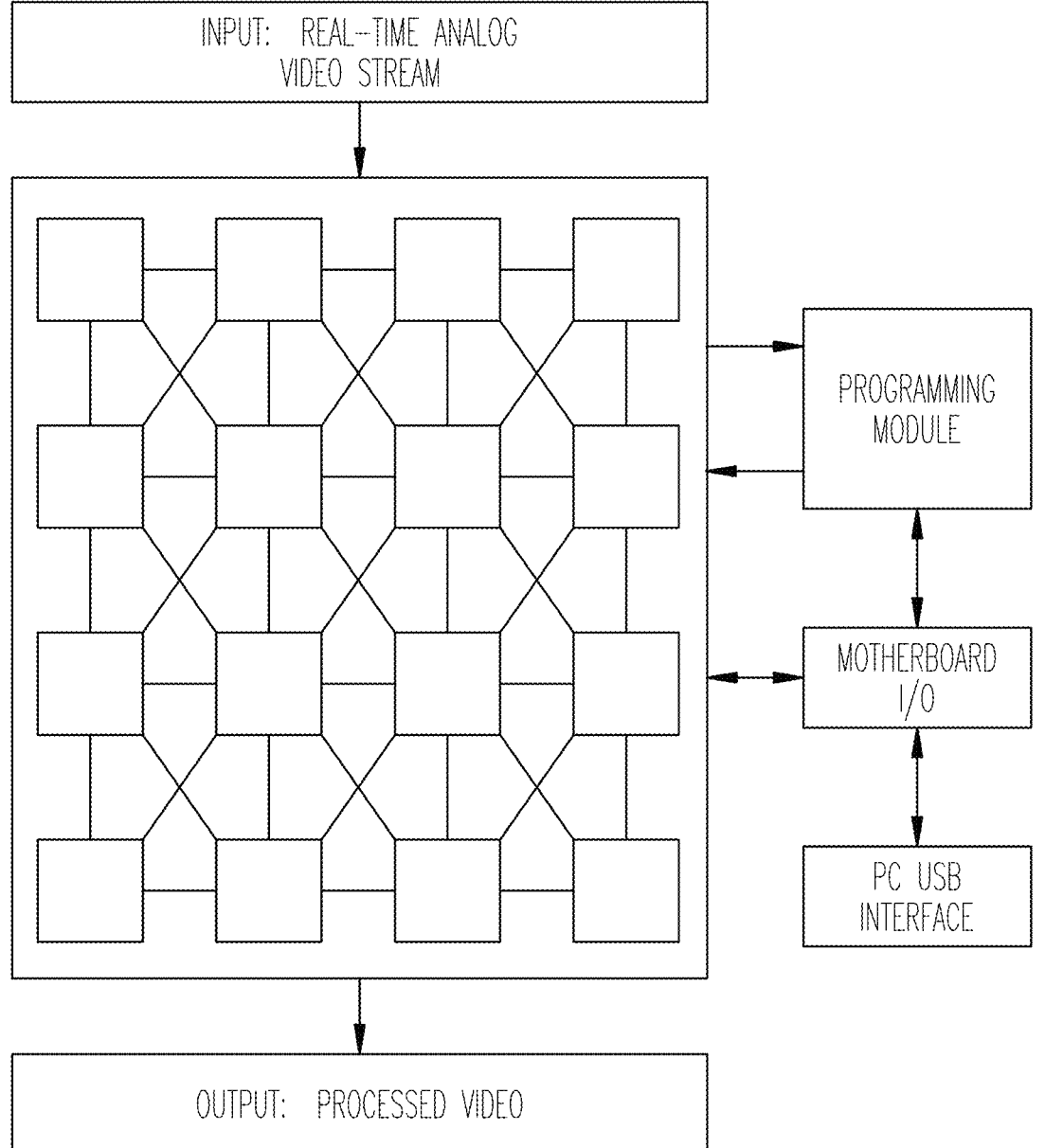
FIG. 8 illustrates a hardware system, according to one example.

An example of a hardware system design is presented in FIG. 8. The figure includes an input module. The input module can include a signal representing a real-time analog video stream. The input signal can include a single image (still) or a time series of images (video) and can be derived from an on-board camera or pre-recorded video content. The input signal is provided to the cellular neural network as shown. In the example shown, the CeNN, having dimensions expressed as rows and columns (M×N pixels), provides an output of processed video. The CeNN is coupled to a programming module and a motherboard I/O. The programming module adjusts synaptic weights based on the selected application. The motherboard I/O is coupled to an interface. The motherboard I/O allows the user to select a task and adjust run-time parameters via the interface. The interface can include a personal computer coupled, for example, by a USB port.

Figure 9:
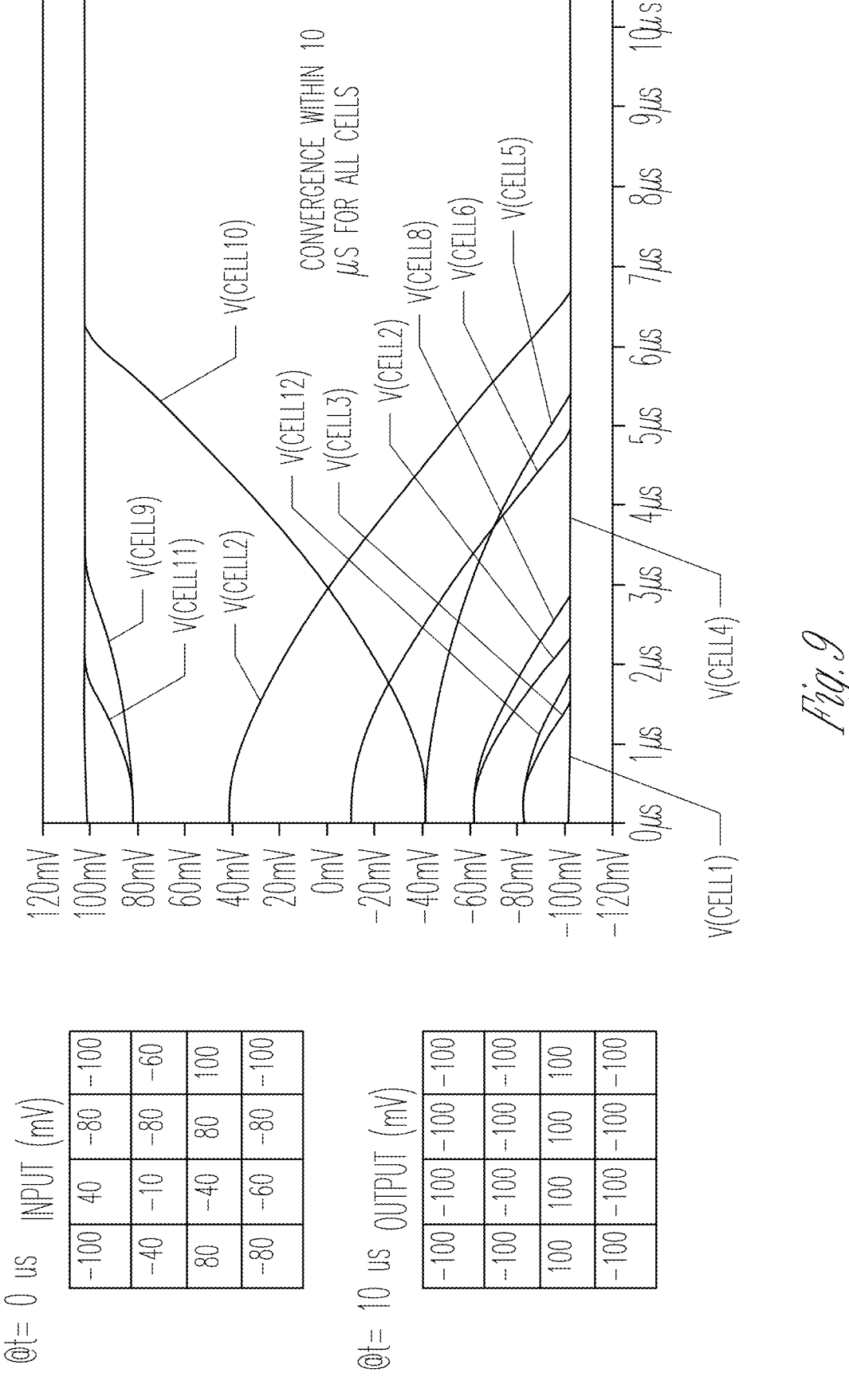
FIG. 9 illustrates processing in a network, according to one example.

According to one example, the hardware depicted in FIG. 8 can be configured to execute processing using a CeNN having dimensions of 4×4, as shown in FIG. 9. The left side of the figure depicts input voltage (mV) per pixel, at time t=0 μs, and depicts output voltage (mV) per pixel, at time t=10 μs. The voltage-time graph, at the right side of the figure, illustrates output convergence occurring within 10 μs, and in the example, that is 100 mV or –100 mV. The line detection illustrated here shows convergence occurring at a frame rate in excess of 100,000 frames-per-second. The dimensions of 4×4 are presented here as one example only and the network can be M×M where M can be thousands, and the frame rate can exceed 100K since the processing is pixel-parallel.

One example of the present subject matter can include an array of memristor bridges, active load, state resistor, and state capacitor fed by a plurality of bridge synapses and one bias synapse configured for synaptic weighting and programming. An example can correspond to a cell output and differential amplifiers (having input from a respective memristive bridge).

A microcontroller can be coupled to a personal computer (PC) interface and configured for iterative programming. A multiplexer (MUX) array can be configured to allow for targeted device programming. The programming can allow for tuning of synaptic weights using electrical pulses and allows for reading of updated weights.

Software executed in conjunction with the hardware can be configured (at the cell level) to execute a read, set, and reset function to allow for programming of the bridge weights for various tasks. In addition, the software can be configured (at the network level) to be configured for pixel input voltages and cell state sensing to provide a primary network interface.

A CMOS-based system typically exhibits a bottleneck during digital-to-analog conversion and at analog-to-digital conversion. In such a system, each column is assigned to an ADC which are multiplexed. This arrangement leads to increased latency which reduces the effective frame rate. In contrast, an example of the present subject matter provides that each image sensor element provides an analog voltage that is directed to the CeNN cells in a parallel manner. By omitting an analog-to-digital conversion, the latency is reduced.

One example provides 3D integration of event-based sensors and processing temporal information with spiking neural networks.

In one example, a DVS system has an active pixel sensor system. A DVS approach provides a biologically-inspired scheme that is asynchronous and has low latency (about one microsecond), provides a high dynamic range (120 dB rather than 60 dB) and has a low bandwidth requirement (since only intensity changes are transmitted, this can be about 200 Kb/second). It additionally requires low storage capacity and reduced processing time and power.

A DVS approach does not rely solely on intensity information. In one example, a DVS system can operate based on a signal change—such as a binary intensity change (analog voltage: x,y,pi to x,y,V).

For an in-sensor system, the sensors on a chip collect the signal and serve as an artificial neural network (ANN). This approach reduces the data movement between sensors and external chips. In addition, the in-sensor system approach allows for tunable photoresponsivity as synaptic weight in the neural network.

An example of the present subject matter enables readout in parallel rather than in a row-by-row fashion. In addition, one example can be configured to operate in a frame-based approach or in an event-based approach—that is, sample and hold or asynchronous.

An example of the present subject matter is directed to a system for a smart sensor. The sensor can include an optical system configured to convert a light signal to an electrical signal. In a traditional system, this amounts to an electric charge that is then digitized and measured at a pixel level. A CMOS sensor typically has light signals integrated into each pixel and the signals are read in a row-by-row manner, thus increasing the number of pixels becomes burdensome.

In one example of the present subject matter, the pixel outputs are read in a parallel manner. In addition to parallel readout, the processing element is located below each pixel sensor. This proximity enables a three-dimensional (3D) approach without the complexity of a large number of interconnect wires and associated components for ADC processing. The signal from the pixel sensor remains in an analog form without needing to convert to a digital form. The signal from the sensor is processed at a site very near the pixel sensor itself.

In one example, edge detection allows for processing of specific pixels for which the signal changes and without the burden of processing data that undergoes no change.

In a frame rate approach, if the pixels are processed together, then the frame rate can be raised to a rate of about 100,000 frames per second. This approach is particularly suitable for processing fast-moving objects and processing the data in a parallel manner. A cellular neural network, as disclosed herein also enables processing in manner whereby each cell is only connected to nearby neighboring cells.

One example of the present subject matter includes using cells having memristors. The memristor configuration allows for reduction of the number of transistors relative to that of a CMOS-based approach. In addition to reducing the number of transistors, the memristor approach allows for a simplified configuration and reduced power consumption. The memristor can be configured to provide non-volatile memory in a small footprint.

One example uses an event-based processing approach. The event-based approach allows for data collection triggered on a signal change. That is, if the signal remains unchanged, then the data need not be collected but if the signal changes, then the data is collected and processed. This approach, using a CeNN for example, enables high efficiency in processing sparse data. By way of summary, a frame-based approach is processed in a traditional manner involving a large amount of data per frame and an event-based approach instead only collects data when change is noted.

One example of the present subject matter uses a CeNN configured by a memristive bridge. The programming can be configured to detect an edge, wherein each number corresponds to a different device state.

One example of the present subject matter includes a smart sensor having a 3D configuration in which each pixel in an array on a first layer is associated with a processor disposed on a second layer and wherein the first layer and the second layer are stacked. In this manner, each pixel is in a 3D configuration with one-to-one connectivity between the pixel and the processor, sometimes referred to as pixel parallel processing.

One example provides analog information processing without converting the analog input signal to a digital representation. By omitting the ADC conversion, performance speed increases and the physical size of the device can be reduced in view of the reduced number of transistors and other components.

In one example, the sensor is physically located in close proximity to the signal processing circuit. This arrangement allows for reduced length of signal lines, reduced noise, and a smaller physical device footprint. In addition, this configuration eliminates or reduces complexity and latency associated with data telemetry requirements such as would be found with a cloud-based approach.

In one example, the processing is performed on a frame-based-approach which allows for reduced latency.

The memristive-based CeNN disclosed herein differs from other neural networks. First, the memristor-based CeNN configuration disclosed herein can be fabricated as a physical hardware network implementation using a printed circuit board with an integrated circuit. The configuration herein considers real-world constraints rather than idealized components.

In one example, the structures of the bridge synapses differ from those of other approaches. One example uses two memristors and two resistors to form a bridge synapse. The two memristor/two resistor topology allows for simplified, predictable programmability and stable synaptic weights. This enables selection of appropriate weights for various applications. In one example, the programming approach uses a voltage pulse train and NMOSFET to adjust programming compliance current to allow the resistance states to be set within a particular tolerance, such as 2% tolerance. In one example, the programming board allows for addressing and programing of each memristor within the synapse individually using an automated feedback loop to ensure the desired state has been achieved. The 2% tolerance limit ensures the hardware network can converge in a stable, accurate manner rather than assuming all four devices within the bridge synapse can be programmed with sufficient precision using a single channel. In one example, the compliance current is modulated to set a device state.

An example of the present subject matter considers CMOS process variation in the development of the network.

In one example, the output conversion is different. In one example, the output conversion of a cell converts the cell state (Vx) into a bounded cell output (Vy) and can be used to configure an op-amp to reduce the output resistance and improve gain and stability.

One example of the present subject matter utilizes a drift memristor based on $Ta/HfO_2$. A memristor based on $Ta/HfO_2$ provides good multilevel capability and stability of each conductance level, and IV (current-voltage) linearity. Other materials are also contemplated, including a memristor having transition metal oxides, perovskites, polymeric materials, etc.

Consider some of the differences between a CeNN and Conventional Neural Network (CNN). A CeNN can produce an output much faster than a CNN for various tasks. Along with having potentially more layers than a CeNN for the same task, a CNN uses a kernel that strides over the input, limiting processing steps to the size of the kernel used. This requires multiple timesteps to process inputs larger than the kernel size. A CeNN, on the other hand, does not require strides and is able to process the whole input in a truly parallel manner, in one timestep.

In one example, a system is implemented based on analog circuitry rather than analog-digital co-design. Omission of an analog-to-digital conversion, as well as digital-to-analog conversion between different layers, allows the system to be scaled for a deep neural network implementation. The ADC conversions take a majority of the energy in prevailing neural networks. As such, a system as disclosed herein provides substantial savings in power consumption, latency, and resources for computation and data storage.

In one example, a system as disclosed here uses a different training phase. In one example, training is performed in-situ rather than ex-situ. This provides improved accuracy and reduced time required for training.

In one example, the neural network synapses and neurons are integrated all together.

Various Notes

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A smart sensor system comprising:
   a sensor having a plurality of transducers arranged on a planar surface, the plurality of transducers including a first transducer and a second transducer wherein the first transducer is configured to produce an analog output signal corresponding to a detected input signal;
   a plurality of cells arranged in a network, the network being a memristive cellular neural network, the plurality of cells including a first cell and a second cell, the plurality of cells disposed proximate to the sensor wherein the first transducer is electrically coupled to the first cell and the second transducer is electrically coupled to the second cell in a one-to-one relation via 3D stacking, wherein the first cell includes a plurality of inputs and a first cell output, wherein each input of the plurality of inputs is coupled to an output of a corresponding plurality of neighboring cells of the plurality of cells, the first cell includes a first memristor and a bridge circuit configured to receive the analog output signal and provide a current corresponding to the detected input signal; and
   a processor coupled to the network and configured to generate a parameter associated with a weight for each cell of the plurality of cells.

2. The smart sensor system of claim 1 wherein the processor is configured to generate the parameter based on the output of the plurality of neighboring cells.

3. The smart sensor system of claim 1 wherein the processor is configured to generate the parameter based on inputs of the plurality of neighboring cells.

4. The smart sensor system of claim 1 wherein the network is configured to execute analog in-memory computing.

5. The smart sensor system of claim 1 wherein the first cell and the second cell are configured to execute in parallel.

6. The smart sensor system of claim 1 wherein the first memristor includes a drift memristor.

7. The smart sensor system of claim 1 wherein the first memristor includes tantalum and hafnium oxide.

8. The smart sensor system of claim 1 wherein the first cell includes a second memristor coupled to the bridge circuit.

9. The smart sensor system of claim 1 wherein the bridge circuit includes a differential amplifier having a differential input corresponding to a voltage determined by a resistance of the first memristor.

10. The smart sensor system of claim 1 including an interface processor coupled to the processor, the interface processor configured to execute an interface program using an operating parameter of the network.

11. The smart sensor system of claim 1 wherein the sensor is disposed on a first layer and the plurality of cells is disposed on a second layer, and wherein the first layer and the second layer are in 3D stacked alignment.

12. The smart sensor system of claim 1 wherein the sensor and the plurality of cells are fabricated in a very large-scale integration (VLSI) circuit.

\* \* \* \* \*